Dec. 23, 1924.  1,520,117
E. BUEHLE
VALVE
Filed May 2, 1923  2 Sheets-Sheet 2
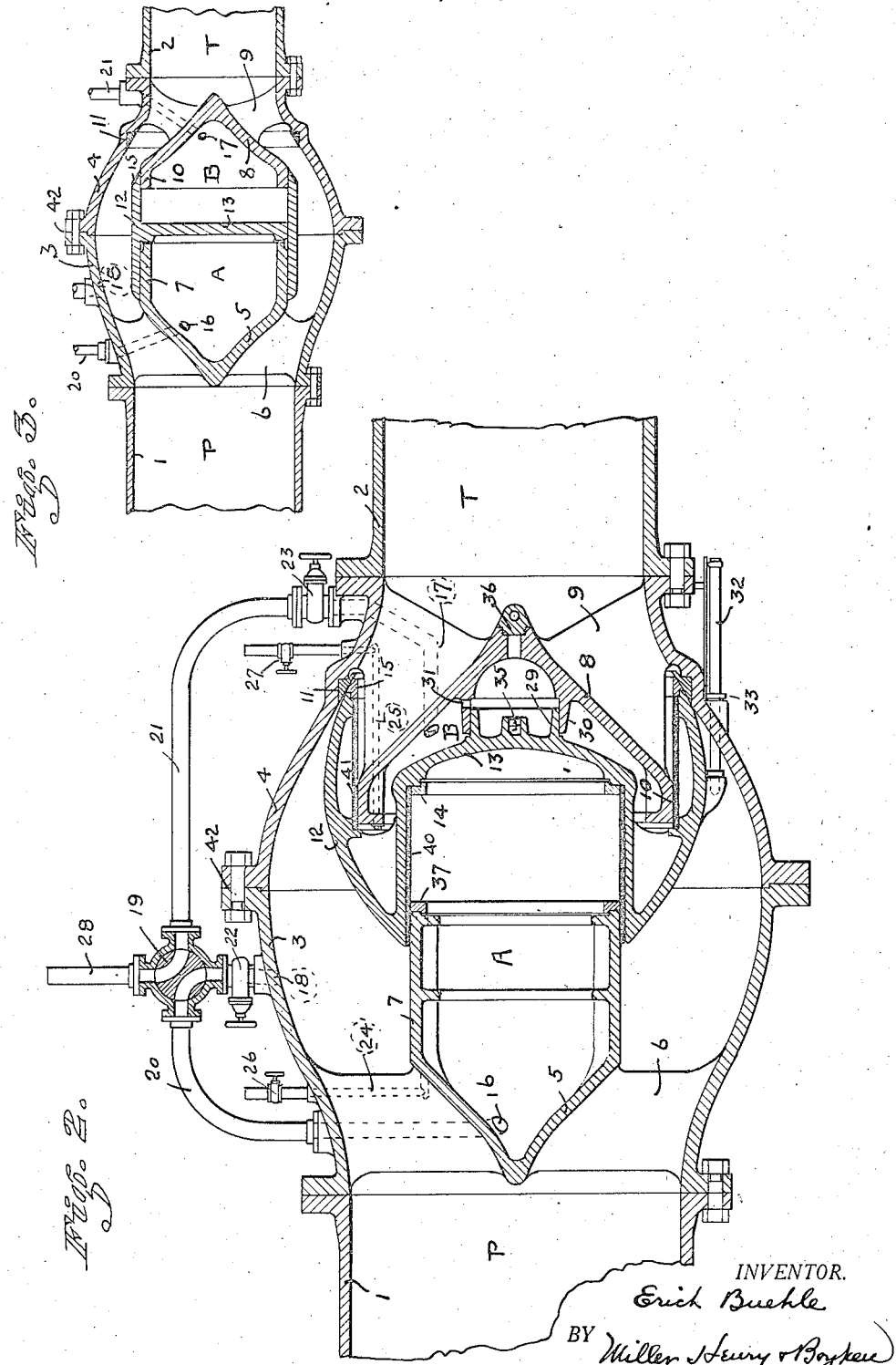
INVENTOR.
Erich Buehle
BY
Miller Henry Boyken
ATTORNEYS.

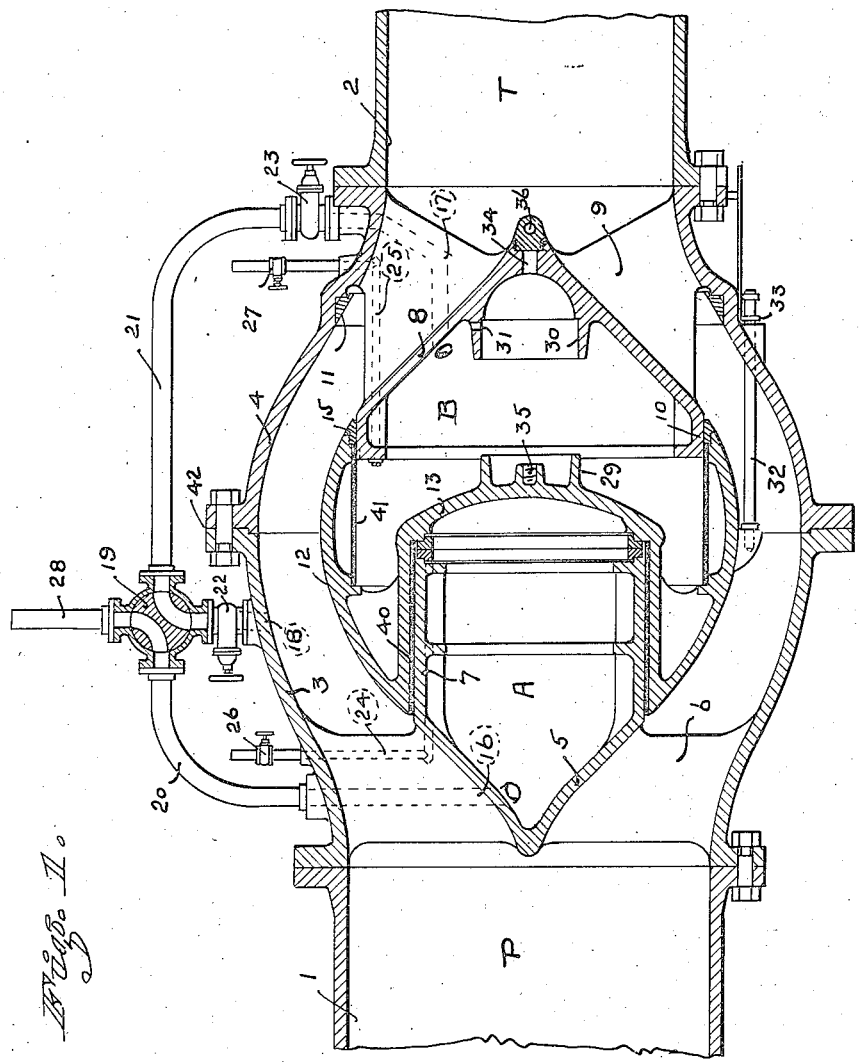

Patented Dec. 23, 1924.

1,520,117

UNITED STATES PATENT OFFICE.

ERICH BUEHLE, OF SAN FRANCISCO, CALIFORNIA.

VALVE.

Application filed May 2, 1923. Serial No. 636,111.

*To all whom it may concern:*

Be it known that I, ERICH BUEHLE, a citizen of Germany, and resident of the city and county of San Francisco, State of California, have invented new and useful Improvements in Valves, of which the following is a specification.

My invention has for its principal object closure means in a fluid conduit adapted to be actuated by fluid pressure to open or close the same, thereby admitting or preventing the flow of fluid from one portion of the conduit to another.

A further object of my invention is such a valve as will when open, admit a fluid flow with the least internal resistance or eddy currents.

A further object is in such a valve, a perfectly smooth walled interior channel for the flow of fluid when the valve is open.

Another object attained by my invention is the balanced condition of the several parts as regards the fluid pressures; that is, the parts are so arranged as to counterbalance each other to a maximum degree whereby the strains and stresses are reduced to a minimum.

Another object is a needle valve type of ring-gate whereby there are two stationary heads or cones which take up the reaction of internal fluid pressures occasioned by change in direction of flow within the valve and wherein the movable part of the valve is least affected by such reactions; that is, no sudden changes in operating forces which move the ring-gate in either direction will affect the reliable operation of the valve.

Other objects will appear from the drawings and specifications.

These objects I accomplish by providing a pair of central members of substantially conical shape, rigidly fixed within the valve casing and provided on their periphery with sliding surfaces co-operating with concentric surfaces formed within a movable member, the said movable member being adapted to slide axially and outside of said conical members.

When the valve is closed the said sliding member contacts preferably (on suitable seats) with the casing at one end of its movement, and retain its jointure with the before mentioned fixed conical portion, thus closing the passageway in the conduit.

By referring to the accompanying drawing my invention will be made clear.

Fig. 1 is a longitudinal sectional view of one form of my valve in its open position.

Fig. 2 is similar to Fig. 1 except that the valve is shown in closed position.

Fig. 3 illustrates somewhat diagrammatically one of the simplest forms of my invention.

Throughout the figures similar numerals refer to identical parts.

The numeral 1 indicates a fluid pressure supply pipe and a delivery pipe is indicated by the numeral 2, one form of my valve being shown arranged between these two pipes. The device consists of a casing in two parts, 3 and 4, connected at the conventional flange joint 42. Within the part 3 is formed the receiving rigid conical member 5 supported from 3 by a plurality of conventional ribs 6. This receiving cone is provided with a cylindrical portion 7. At 8 is a delivery cone fixed to the casing member 4 by a plurality of conventional ribs as 9. A cylindrical portion 10 is formed with 8. The stationary cylindrical portions 7 and 10 cooperate with the moving valve member 12 as will be more fully set forth below. At 11 is shown a ring seat in the casing member 4 against which the ring member 15 in the valve 12 contacts when the valve is closed as shown in Fig. 2. At 16 is a duct connecting preferably through one of the ribs between the cone 5 and the casing 3 and establishing a passage from the chamber A to the pipe 20. At 17 is a similar passageway from the chamber B to the valve 23 and pipe 21 and at 18 is a connecting passage from the pressure side P through the valve 22 and to the control valve 19. At 24 is a drain passage communicating with the chamber A and valve 26 and at 25 a drain passage from chamber B to valve 27. At 28 is a discharge pipe opening to atmospheric pressure from control valve 19. At 29 is a piston and at 30 a cylinder with which 29 co-operates. At 31 an outlet from the cylinder 30. A connecter rod is shown at 32 passing through a packing gland 33, while at 34 is an opening exposed to the chamber B when the plug 36 is removed and through which a rod may pass to the thread 35. The movable valve 12 is provided with a closed head 13 and a liner 40 co-operating with the cylinder portion 7 of the cone 5 and a second liner 41 co-operating with the cylindrical portion 10 of the cone 8.

Referring specifically to Fig. 1 showing the open position of my valve: Fluid under pressure is presumed to be flowing from "P" through the valve "T", and as may be seen, the control-valve 19 is in such a position so as to freely admit the pressure from "P" and through outlet 18, control valve 19, pipe 21, valve 23 and passage 17 into the chamber "B". At the same time it will be seen that chamber A is open through passage 16, pipe 20 and control valve 19 to the exhaust pipe 28.

The fluid pressure which now holds the gate tight against seat-ring 37, is equal to the area of that part of cover 13, which lies inside of seat-ring 14 multiplied by the unit-fluid-pressure. This force holds the two seat-rings, 37 and 14, in tight contact, and therefore does not permit any pressure-fluid to enter chamber A.

If it should become desirable to inspect or repair any part of the control-valve 19 or any other part or pipe which form part of the outside control mechanism, then valves 22 and 23 may be shut tightly without having any effect on the force which holds the ring-gate in its open position. The reason for this is the fact that the pressure which, while the valve is open, is also within pipe 2, may enter the chamber B through the small clearance between the periphery of cylinder-part 10 and the corresponding bore of the ring-gate and seat 12, 15.

To close the valve, it is only necessary to reverse the direction of flow through the control-valve by setting it in the position shown in Figure 2. The pressure fluid is now communicated from outlet 18 through valve 22, control valve 19, pipe 20, and port 16, into chamber A. And at the same time chamber B is opened through port 17, valve 23, pipe 21 and control-valve 19, to exhaust pipe 28.

When control-valve 19 is set into the position shown in Fig. 2 the ring-gate will begin to move from left to right, until the seat-ring 15 on the gate comes into contact with the seat-ring 11 in the valve body. The force which is actually employed to move the gate from its open position to its closed position is equal to the area of a circle of the diameter of cone 8 multiplied by the unit pressure of the water within the system.

The speed of travel of the gate from its open position to its closed position depends on the size of the openings within the control valve, through which the fluid passes into chamber A and is discharged from chamber B.

In almost all cases where valves which carry an incompressible fluid as water are installed, it is desirable to slow down the motion of the gate during the last part of its travel to take up the inertia of the moving mass and to avoid dangerous water hammer in the system. This so-called dampening effect on the motion of the ring-gate is accomplished automatically in my valve in the following manner.

I provide a short cylindrical projection or piston 29 on cover 13, adapted to telescope into a second cylindrical projection or cylinder 30 on cone 8. A small hole 31 passes through the wall of cylinder 30, and as the piston 29 enters the cylinder 30 the water within the chamber B has to pass through the small hole 31 and thence is exhausted through port 17. The resistance which is thereby set up in chamber B by the pressure required to force the water through hole 31 will slow down the movement of the ring-gate and prevent the water hammer.

While the ring-gate is now in its closed position, it is held tight against the seat-ring 11 in the valve body by a force equal to the area of a circle of a diameter of cone 8 multiplied by the unit pressure within the system.

By reversing the position of the control-valve the ring-gate will again travel from its closed position to its open position.

The position of the ring-gate within the valve body is at any time visible by the position of the indicator rod 32 which is fastened to the ring-gate and passes out through the body through stuffing box 33.

For the purpose of moving the ring-gate into open position or closed position when there is no pressure in the system available for operation, cone 8 is provided with a hole 34 through which a bolt can be inserted and screwed into a tapped hole 35 in the head 13. Normally this hole 34 is provided with a plug 36.

For the purpose of expelling the air from within chambers A and B at the time when the valve is put in service for operation, there are provided outlets 24 and 25 from these chambers to the outside of valve body, and to both of these outlets there are attached valves 26 and 27 for the purpose of closing these ports after the air has been expelled.

In Fig. 3 is shown a somewhat simplified form of my invention in which the exterior cylindrical surfaces of the cones 7 and 10 are of the same diameter and the valve 12 is of a construction employing the least metal and of simple contour.

I claim:

1. In a valve, an exterior casing within which are fixed a pair of axially positioned conical ended members directed upstream and down stream, respectively, a closure element external to said conical members and movable axially thereon and having an external surface complementary with the surfaces of the members in one of its moved positions and at such time forming a smooth annular channel with the exterior casing.

2. In a valve, a casing, a pair of fixed right and left directed axially positioned conical ended members, a closure element movable on said members to open or close a channel formed with said casing, a seat ring in said casing against which said element contacts in closed position.

3. In a valve, a casing, a pair of fixed right and left directed axially positioned conical ended members, a closure element telescopically movable on said members to open or close a channel formed with said casing, a seat ring in said casing against which said element contacts in closed position, a diaphragm on said element movable between the members and fluid connections adapted to establish pressure on either side of said diaphragm.

4. In a valve, a casing, a pair of fixed right and left directed axially positioned conical ended members, a closure element telescopically movable on said members to control the flow of fluid through the valve, said element having a piston head between the members, fluid connections between the head and each of the members and valve means in combination therewith constructed and adapted to establish pressure and discharge to move said element open or to close the passageway between the members and the casing.

5. In a valve, a casing, a pair of fixed right and left directed axially positioned conical ended members having a cylindrical periphery, an annular element telescopically movable on said cylindrical peripheries whereby is opened or closed a fluid channel, said element having a piston head between the members, fluid connections and valve means in combination therewith constructed and adapted to establish pressure and discharge to move said element to open or to close the said channel, and a damping piston and cylinder between one of the cones and the element and a restricted outlet to said cylinder whereby the movement of the element is retarded during the latter part of its closing movement.

6. A valve as set forth in claim 1 wherein the conical ended members on which the element moves have cylindrical peripheries of different diameter on which the element is constructed and adapted to telescopically slide.

7. A valve as set forth in claim 2 wherein the conical ended members on which the element moves have cylindrical peripheries of different diameter on which the element is constructed and adapted to telescopically slide.

8. A valve as set forth in claim 3 wherein the conical ended members on which the element moves have cylindrical peripheries of different diameter on which the element is constructed and adapted to telescopically slide.

9. A valve as set forth in claim 4 wherein the conical ended members on which the element moves have cylindrical peripheries of different diameter on which the element is constructed and adapted to telescopically slide.

10. A valve as set forth in claim 5 wherein the conical ended members on which the element moves have cylindrical peripheries of different diameter on which the element is constructed and adapted to telescopically slide.

ERICH BUEHLE.